United States Patent Office 3,451,984
Patented June 24, 1969

3,451,984
NOVEL FURFURYL ALCOHOL PROCESSES AND PRODUCTS
Pierre Bourguignon, Sceaux, and René Lemaistre, Melle, France, assignors to Les Usines de Melle (Societe Anonyme), Melle, Deux-Sevres, France, a corporation of France
No Drawing. Filed Sept. 21, 1966, Ser. No. 580,867
Claims priority, application France, Sept. 27, 1965, 32,806
Int. Cl. C08f 5/04
U.S. Cl. 260—88.5      8 Claims

ABSTRACT OF THE DISCLOSURE

Process for the preparation of resins from furfuryl alcohol by heating at 120° C. to 180° C. in the presence of a catalytic amount of antimony trioxide.

---

This invention relates to novel resins and to the processes for making such resins, and more particularly, it relates to the preparation of polymers from furfuryl alcohol and the products obtained thereby.

Resins are conventionally produced from furfuryl alcohol by heating the alcohol in an aqueous medium with an acid catalyst such as hydrochloric, sulfuric, or phosphoric acid. The polycondensation product so obtained is water-insoluble and can be separated from the aqueous medium by decantation. The polycondensation product or prepolymer so formed is called a furfuryl alcohol resin. The acid catalyst is subsequently removed by washing and the resin is then dried. After drying, the resin can be polymerized either by use of a catalyst alone, for example, paratoluene sulfonic acid, or by the combination of heat and a catalyst such as maleic anhydride or acid.

Furfuryl alcohol resins produced according to these conventional processes are subject to two major disadvantages; instability and uncontrolled polymerization. This instability occurs even at low temperatures and is primarily the result of incomplete removal of the prepolymerization acid catalyst. The instability results in an increase of the viscosity when the resin ages, and finally in solidification of the resin. The uncontrolled polymerization reaction is due to the presence of free furfuryl alcohol in the resin during the curing to produce the final polymer.

This invention provides novel processes for polymerizing furfuryl alcohol to obtain stable resins and polymers, as well as new products obtained thereby.

Further and more specific objects, features, and advantages will clearly appear from the detailed description given below.

The invention comprises the novel products as well as the novel processes and steps of processes according to which such products are manufactured, the specific embodiments of which are described hereinafter by way of example and in accordance with which it is now preferred to practice the invention.

In accordance with the invention, polymers are produced by heating furfuryl alcohol in the presence of antimony trioxide catalyst to form furfuryl alcohol resin and separating the catalyst from the resin.

Briefly, the process of this invention for the preparation of furfuryl alcohol resins and polymers comprises heating furfuryl alcohol in the presence of an antimony trioxide ($Sb_2O_3$) catalyst to form a furfuryl alcohol resin and separating the catalyst from the resin. The resin so formed is substantially water-insoluble. The term resin used herein means a prepolymer of furfuryl alcohol which can be used in the preparation of furfuryl alcohol polymers.

The process of this invention provides numerous advantages over prior art processes involving conventional acid catalysts. For instance, the prepolymerization reaction taught herein proceeds gradually so that the desired degree of polycondensation can be obtained and the reaction then stopped by simple cooling of the reaction mixture, since the antimony oxide catalyst is effective only at high temperatures on the order of 120–180° C. Moreover the catalyst according to this invention is easily removed completely by decantation, filtration, centrifugation, and the like or a combination of these techniques, since the antimony trioxide is insoluble in both the original alcohol and the prepolymer and thus provides a product which is very stable on aging.

Further according to the present invention, any unreacted furfuryl alcohol is readily removed by distillation under reduced pressure owing to the stability of the resin formed. It is accordingly possible to obtain either fluid or relatively viscous resins containing very low amounts of free furfuryl alcohol by suitable control of the condensation and distillation conditions. The freedom from unreacted furfuryl alcohol in the resin means that the subsequent polymerization reaction can proceed more gradually, and curing to provide the final polymer is facilitated. Moreover, the furfuryl alcohol resin produced according to this invention is suitable for the preparation of so-called "precatalyzed" resins, as described below.

The antimony trioxide, $Sb_2O_3$, used as a prepolymerization catalyst according to this invention is desirably used in amounts of from about 0.1% to about 10%, based on the furfuryl alcohol. It is preferred to use from about 0.3% to about 2% of this catalyst. Unless otherwise indicated, all parts, percentages, proportions and ratios herein are by weight.

The prepolymerization reaction of this invention is preferably carried out at temperatures on the order from about 120° to about 180° C. Water is formed in the reaction. Removal of water of reaction will be facilitated by the use of an entraining agent which azeotropically entrains such water as it is formed in the reaction mixture. Water entraining agents such as benzene, cyclohexane, ethyl acetate, and the like can be used in this process.

After the prepolymer has been formed, the catalyst is readily removed by decantation, filtration, centrifugation, and the like or by a combination of such techniques. It has been found that a simple decantation is generally sufficient to remove the bulk of the antimony trioxide. Any fines of the catalyst which remain in the raw resin have been found not to cause further condensation during a subsequent distillation step, provided that the distillation temperatures be maintained below about 120° C. Such temperatures for the distillation can readily be obtained at subatmospheric pressures. Thus, the resin can conveniently be distilled at pressures on the order of 30 mm. Hg.

In some instances the unreacted furfuryl alcohol recovered during the distillation step may have lost part of its initial reactivity. It is accordingly preferred to distill the recovered furfuryl alcohol before its reuse in the reaction. It is possible to avoid the redistillation step by mixing the recovered furfuryl alcohol with fresh alcohol.

The process of this invention utilizing antimony trioxide catalyst also permits the continuous manufacture of furfuryl alcohol resins by a number of techniques. For example, the mixture of furfuryl alcohol, antimony oxide, and if desired, water entraining agent is continuously introduced into a reaction vessel fitted with stirring means and surmounted by a distillation column for removal of the water of reaction. The raw prepolymer product overflows from the reaction vessel into a rotary filter for removal of the antimony trioxide particles. The use of a precoating on the filter is optional, depending upon the size of the antimony oxide particles to be removed.

The filtrate from the rotary filter is introduced into a vacuum distillation column, and unreacted furfuryl alcohol is withdrawn as the overhead from the column and continuously returned to the prepolymerization step. The furfuryl alcohol resin is withdrawn from the base of the column.

In another continuous process permitted by the process of this invention, the prepolymer formation can be carried out in a heated furnace containing the catalyst in particulate form, for example as pellets. Liquid or vaporized furfuryl alcohol is passed through the furnace to form the resin. The raw resin is then introduced into a first distillation column for water removal, and the remainder of the process is carried out substantially as described above with the rotary filter and subsequent vacuum distillation.

The furfuryl alcohol resin produced according to the process taught herein can be condensed to form the final polymer, either through the agency of a catalyst such as paratoluene sulfonic acid or of heat plus a catalyst such as maleic anhydride or maleic acid. The final polymerization step can be carried out immediately, or the resin can be stored and used some time later.

Additionally the resin of this invention can be used to prepare a precatalyzed resin. The precatalyzed resin is the combination of the novel resin herein disclosed with from about 1–5% of a latent catalyst such as maleic acid, maleic anhydride, a methylfuran-maleic anhydride Diels-Alder condensation product and the like. While such a precatalyzed resin has good stability at room temperature, the final polymerization can be initiated simply by heating.

The following examples are given to illustrate preferred embodiments of this invention as it is now preferred to practice it. It will be understood that these examples are illustrative, and the invention is not to be considered as restricted thereto except as indicated in the appended claims.

EXAMPLE I

Preparing the prepolymer

A mixture of 1600 g. furfuryl alcohol, 16 g. antimony oxide ($Sb_2O_3$), and 30 g. of benzene water-entraining agent is heated with constant stirring. When the temperature is heated with constant stirring. When the temperature is heated with constant stirring. When the temperature, substantial amounts of reaction water are formed. This water is entrained and removed from the bath by the benzene, and thereafter the water is separated from the benzene by decantation. The temperature of the bath increases gradually up to 159° C. at which time the weight of water removed is about 89 g., that is, about 30.3% of the amount of water which theoretically can be liberated by the total condensation reaction of the starting 1600 g. furfuryl alcohol. The raw resin so obtained has a viscosity of 15 centipoises at 25° C., after removal of the benzene, and contains about 54% of unreacted furfuryl alcohol.

Removing the catalyst

The bulk of the catalyst is removed by decantation. A certain amount of oxide fines remain in the product, but this is insufficient to cause the condensation reaction to proceed further during the distillation steps.

Removal of the free furfuryl alcohol

The raw resin is heated under a reduced pressure of 30 mm. Hg to distill off and thus remove the unreacted furfuryl alcohol which under this pressure distills off at about 90° C. When 850 g. of overhead containing the furfuryl alcohol together with a small quantity of difurylmethane has been removed, the temperature in the distillation vessel reaches about 180° C.

About 650 g. of a resin containing substantially no free furfuryl alcohol and having a viscosity of 1200 centipoises at 25° C. is obtained. If about 4% by weight of furfuryl alcohol is left in the final resin, the viscosity will only be about 350 centipoises at 25° C.

EXAMPLES II–IV

Furfuryl alcohol precondensation products are prepared by removing 22.8%, 41.5% and 51%, respectively, of the theoretical water of reaction. The condensation, catalyst removal, and distillation to remove free furfuryl alcohol are carried out substantially as described in Example I. The results are set forth in Table I:

TABLE I

| Example | Water removed (percent of the theoretical water) | Free alcohol removed (percent of the starting alcohol) | Viscosity of the raw resin (centipoises) | Max. temperature (° C.) in the distillation step | Viscosity of the final resin (centipoises) |
|---|---|---|---|---|---|
| II | 22.8 | 60 | 13.5 | 180 | 1,225 |
| III | 41.5 | 38.5 | 25 | 180 | 1,300 |
| IV | 51 | 32.2 | 42.5 | 180 | 1,425 |

It has been observed during the prepolymerization reaction that the temperature increases when the reaction proceeds further toward completion as illustrated by the data shown in Table II:

TABLE II

| Water removed (percent of the theoretical) | Duration of the operation | Initial temperature (° C.) | Final temperature (° C.) |
|---|---|---|---|
| 22.8 | 1 h. 5 mn. | 135 | 152 |
| 30.3 | 2 h. | 140 | 159 |
| 41.5 | 2 h. 30 mn. | 136 | 169 |
| 51 | 2 h. 45 mn. | 140 | 177 |

EXAMPLE V

Incorporation of latent catalyst

To illustrate the use of a latent catalyst in conjunction with the resin prepared according to this invention, 2% of maleic anhydride is added to the resin after the antimony oxide has been removed, but with some free furfuryl alcohol remaining. The maleic anhydride is gradually introduced into the resin at a temperature of 20–25° C., in small quantities over one-half hour to avoid any substantial temperature increase. The viscosity of the resin slightly increases from 240 cp. to 320 cp. (measured at 25° C.). The final viscosity of the resin remains substantially unchanged for at least three months at a temperature of 25° C.

EXAMPLE VI

Testing the stability of the resin

A furfuryl alcohol resin produced in accordance with the invention containing less than 5% by weight of free furfuryl alcohol and having a viscosity of 300 centipoises at 25° C. is maintained at 100° C. for 510 hours. The resin does not solidify.

Testing the stability of a resin containing latent catalyst

To the resin described above in Example VI is added a small amount of maleic anhydride according to the procedure described in Example V. Portions of the resin-maleic anhydride mixture are heated to temperatures of 60°, 80° and 100° C., respectively, and the results are set forth in Table III:

TABLE III

| Composition | Temperature (° C.) | Results |
|---|---|---|
| Resin+2% maleic anhydride | 60 | Unchanged after 8 weeks. |
|  | 80 | Solidified after 10 days. |
|  | 100 | Solidified after 11 hours. |
| Resin+3% maleic anhydride | 100 | Solidified after 3 h. 40 m. |
| Resin+4% maleic anhydride | 80 | Solidified after 48 hours. |

What is claimed is:

1. A process for preparing resins which comprises heating furfuryl alcohol at a temperature of from about 120° C. to about 180° C. in the presence of a catalytic quantity of antimony trioxide as a catalyst and separating the catalyst from the resin.

2. The process of claim 1 wherein the proportion of antimony oxide is from about 0.1% to about 10% of the furfuryl alcohol.

3. The process of claim 1 wherein any unreacted furfuryl alcohol is separated from the resin by distillation at subatmospheric pressure.

4. A process as in claim 1 which is carried out in the presence of a water entrainer which forms an azeotrope with water and including the step of separating the azeotrope.

5. A process as in claim 4 in which the water entrainer is benzene.

6. The process of claim 4 wherein the alcohol, catalyst, and entrainer are continuously introduced into a reaction vessel surrounded by a distillation column for the removal of the water of reaction.

7. The process of claim 1 wherein the furfuryl alcohol is continuously passed through a bed containing particulate catalyst and the reaction water is removed by a distillation following the passage of the alcohol over the catalyst.

8. The process of claim 1 including the additional step of condensing the resin.

References Cited
UNITED STATES PATENTS

| | | | |
|---|---|---|---|
| 2,681,896 | 6/1954 | Nielsen | 260—88.5 |
| 2,813,846 | 11/1957 | Farber et al. | 260—88.5 |
| 3,055,844 | 9/1962 | Jaffe et al. | 260—88.5 |
| 3,158,592 | 11/1964 | Nielsen | 260—88.5 |

HARRY WONG, JR., *Primary Examiner.*

U.S. Cl. X.R.

260—347.8, 347.9